June 1, 1954

W. R. YOUNG, JR 2,680,194

RADIOTELEPHONE RECEIVING SYSTEM

Original Filed May 20, 1949

4 Sheets-Sheet 1

INVENTOR
W. R. YOUNG, JR.
BY Robert J. Fluskey
ATTORNEY

June 1, 1954

W. R. YOUNG, JR 2,680,194

RADIOTELEPHONE RECEIVING SYSTEM

Original Filed May 20, 1949

4 Sheets-Sheet 2

INVENTOR
W. R. YOUNG, JR.
BY
Robert J. Fluskey
ATTORNEY

June 1, 1954 W. R. YOUNG, JR 2,680,194

RADIOTELEPHONE RECEIVING SYSTEM

Original Filed May 20, 1949

4 Sheets-Sheet 3

INVENTOR
W. R. YOUNG, JR.
BY Robert J. Fluskey
ATTORNEY

June 1, 1954 W. R. YOUNG, JR 2,680,194

RADIOTELEPHONE RECEIVING SYSTEM

Original Filed May 20, 1949

4 Sheets-Sheet 4

INVENTOR
W. R. YOUNG, JR.
BY
Robert J. Fluskey
ATTORNEY

Patented June 1, 1954

2,680,194

UNITED STATES PATENT OFFICE 2,680,194

RADIOTELEPHONE RECEIVING SYSTEM

William R. Young, Jr., Summit, N. J., assignor to Bell Telephone Laboratories, Incorporated, New York, N. Y., a corporation of New York Original application May 20, 1949, Serial No. 94,448, now Patent No. 2,636,982, dated April 27, 1953. Divided and this application August 11, 1951, Serial No. 241,444

4 Claims. (Cl. 250—27)

This is a division of application Serial No. 94,-448, filed May 20, 1949, now United States Patent No. 2,636,982 of April 28, 1953, for Radiotelephone Receiving System Employing a Plurality of Receivers.

This invention relates to electric signaling systems and more particularly to methods and means for selecting an individual message signal wave from a plurality of such waves.

It is frequently desirable to receive at a number of geographically separated locations the same message signals, and to select from the received signals only that train of received signals which, at any instant, provides the best communication channel. Multiple reception of the same message signals is frequently employed in mobile radio communication systems and in systems in which the signals are transmitted through a variable transmission medium, such that signals received at one location may be subjected to considerably more attenuation than are signals received at a different location.

In such communication systems, it is generally believed to be desirable to select, at any instant, only one such train of received message signals, since if two or more such signal trains are combined, the phase relations of the combined currents may be such as to produce a detrimental or undesirable effect. Furthermore, such signal wave energies are usually accompanied to a greater or lesser degree by noise signal currents. Where such signal currents are directly combined, a more desirable train of signal waves may be impaired by the noise energies that accompany another and less desirable train of signal waves with which it is combined.

It is accordingly one object of this invention to improve the means for selecting from a plurality of received message signals the train of message signals which, at any instant, is judged to be the most desirable.

It is also an object of this invention to provide, in a radio communication system, a means for receiving the message signal waves in which the effect of interfering noise currents is minimized, and in which the reliability of reception is increased.

It is a further object of this invention to provide means for continuously determining the amount of interfering noise currents that accompany the received message signal waves, and to choose between the received message signals in accordance with this determination.

In accordance with the present invention, the same transmitted message signal wave may be received at a number of geographically separated points, and the noise energy that accompanies each train of the received signal waves is continuously determined. At each receiver location there is derived a unidirectional voltage, the amplitude of which is indicative of the level of the interfering noise waves that are received with the message signals at that location. These voltage indications are transmitted to a centrally located selection point. At this selection point a means is provided for continuously comparing the noise-indicating amplitudes of these received unidirectional voltage signals, and for connecting to a utilization circuit the output of the message signal receiver which produces the most desirable unidirectional signal. Means are also provided at this centrally located selection point for canceling the effect of any induced longitudinal currents that may be added to these derived signals in the transmission paths between the receiver locations and the selection point.

It is a feature of this invention that the continuous determination of the noise energies that accompany the received message signals is made by determining the energy level of the noise currents in the frequency spectrum immediately above and beneath, but not within, the signal frequency spectrum.

It is also a feature of this invention that this noise energy determination is made in such a manner that the different types of noise interference are weighted in much the same manner as their interference effects are noted by the human ear.

It is a further feature of this invention that the relative desirability of each received train of message signal waves is indicated by a unidirectional voltage signal, derived or otherwise generated electrical quantity or factor, for example, the amplitude of which changes with variation in the noise energy that accompanies the signal wave.

Still another feature of the invention is that the effects of longitudinal noise currents that may be induced in the connections over which such merit indicating signals are transmitted, between the points of reception of the noise energies and the centrally located selection station, are nullified.

The manner in which the foregoing objects and features of the invention are realized may be best understood from the following description when considered in conjunction with the drawing in which.

*General description*

Figures 1, 6:
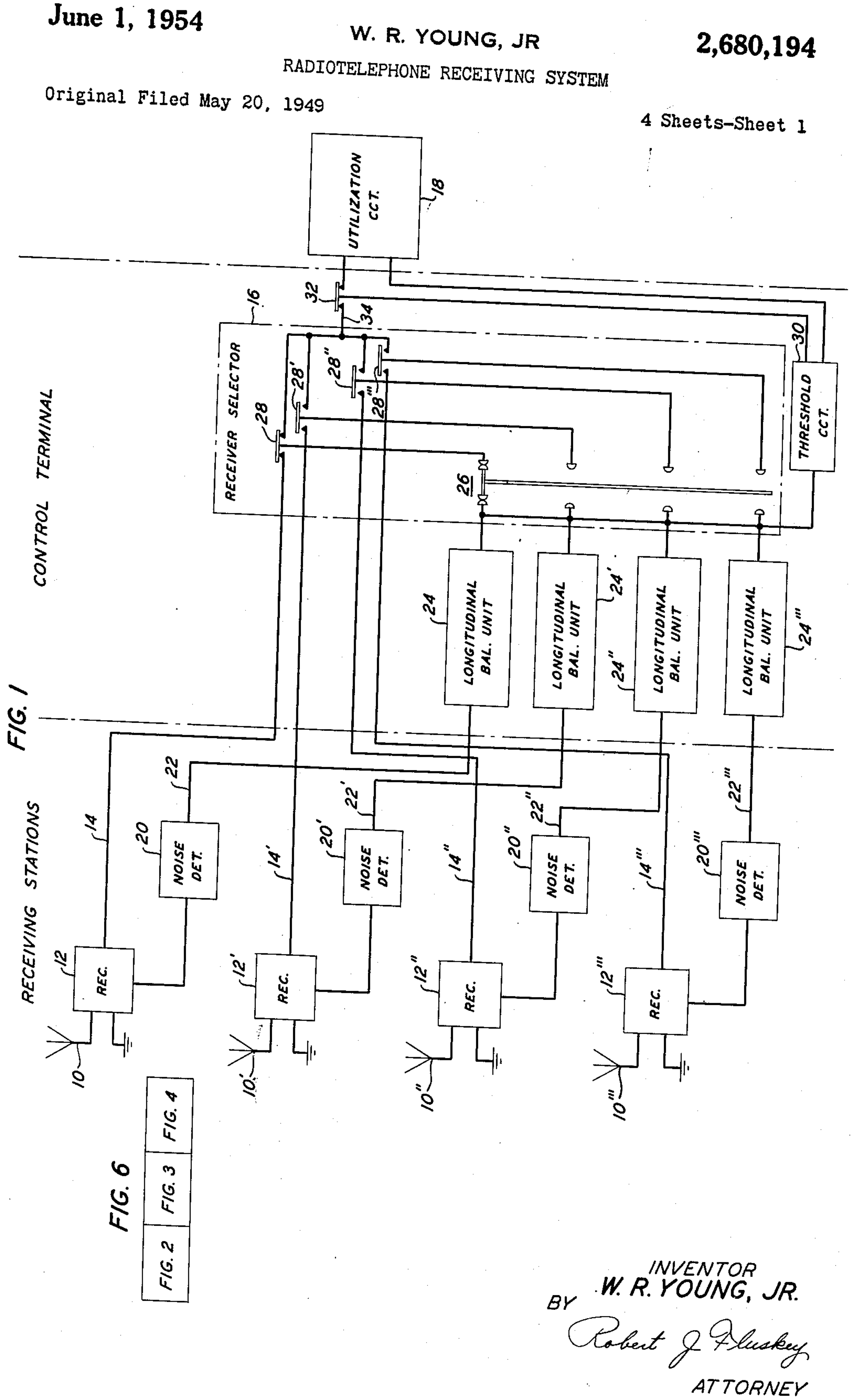
Fig. 1 is a block schematic diagram of a radio receiver selection system in accordance with the invention when arranged to choose between the signal outputs of a plurality of receivers of the same message signal wave.
Fig. 6 shows how Figs. 2, 3 and 4 may be arranged to disclose the complete circuit of one branch of a selecting system which is arranged in accordance with the invention.

The invention will now be generally described as being incorporated in a system for selecting the most desirable one of four trains of the same message signal waves. It will be understood that, although the invention is described as being incorporated in a system for selecting the output of one of four message receivers, this number does not constitute a limitation on the invention, since systems embodying the invention may involve as few as two or be expanded to choose from among any reasonable number of such message receivers. Referring to Fig. 1, the same message signal waves are received on the geographically separated antennas 10, 10′, 10″, and 10‴. Each of these antennas is connected to a radio receiver 12, 12′, 12″, and 12‴, respectively, which receivers are substantially alike and may be adapted for the reception of either amplitude-modulated, phase-modulated, or frequency-modulated signal waves. Each receiver is preferably arranged such that the volume of its audio frequency output signal is substantially independent of the level of its received radio frequency signal waves, if the energy level of these waves exceeds a predetermined minimum value; but is determined principally by the intensity of the modulating signal, or level of modulation at the transmitter. Under these circumstances, the level of the audio frequency message signal wages is substantially the same in the output circuit of each receiver 12, 12′, 12″, or 12‴, at any instant, if the received radio frequency signals exceed this minimum level. Noise interference energy that may be received by any one of the antennas 10, 10′, etc. will be added to or included in the received message signal waves, and such interference energy will be more prominent in the receiver output product as its ratio to the audio frequency message signal energy in the receiver output is increased. The audio frequency output of each receiver 12, 12′, etc. is divided, and one portion of this energy from each receiver is transmitted over connections 14, 14′, etc. to a control terminal or selecting point, where it may be connected by a receiver selector 16 to a utilization circuit 18. The second portion of this output energy is supplied to a respective noise detector 20, 20′, etc., which is preferably situated at the same location as its radio receiver 12, 12′, etc. Noice detector 20 operates on this portion of the output energy to extract from it only the noise energies that exist in the frequency spectrum immediately above and below, but not within, the message signal band. It has been determined that, in general, the amount of noise in the voice frequency band of interest is closely related to the amount of noise which occurs above and below that band. A measure of these latter quantities is therefore an indirect but satisfactory measure of noise in the message signal band of interest. This extracted energy is then weighted in a manner which will presently be described before it is used to derive a unidirectional signal, the amplitude of which is indicative of the weighted amount of noise encountered in the previously mentioned portions of the frequency spectrum. The amplitude of this unidirectional signal is related to the amount of extracted noise energy, and in this described embodiment, it varies in inverse relation to the amount of this noise energy. It should be appreciated that this inverse relation between the amount of extracted noise and the amplitude of the derived signal need not necessarily be followed, and it should not be construed to be a limitation upon the invention. These unidirectional merit indicating voltage signals from the noise detectors 20, 20′, etc. are transmitted to the control terminal, or selection point, over connections 22, 22′, etc. For general descriptive purposes, these connections 22, 22′, etc. are shown as being separate from connections 14, 14′, etc. However, as will be later described in connection with Fig. 2, the paired connections 14, 22 or 14′, 22′, etc. may actually consist of a conductor pair.

The control terminal, or selection point, will generally be, but need not necessarily be, geographically separated from the location of receivers 12 and noise detectors 20. The unidirectional merit indicating signal from each noise detector 20 is received by a respective longitudinal balancing unit 24, 24′, etc. at the control terminal. In this unit, the signal is converted from a balanced-to-ground signal to a single-ended or unbalanced signal, and any longitudinal noise currents which may have been added to it in the connecting path 22 are effectively eliminated. The signal output of each longitudinal balancing unit 24, 24′, etc. consists of a unidirectional voltage, which has at any instant an amplitude that is representative of the weighted amount of noise energy that accompanies the audio frequency message signal energy in the output circuit of a respective receiver. Since, as was previously stated, the message signal energy in the output of each receiver is at any instant at the same level, it follows that a comparison of the noise energy indications, or merit indicating signals, for the receivers is in effect a comparison of the signal-to-noise ratio of the respective receivers. This comparative function is performed in receiver selector 16 at the control terminal. For general descriptive purposes, this unit is functionally indicated in Fig. 1 as a mechanical switch arrangement comprising the main contactor 26 and switches 28, 28′, 28″, etc. In addition, a threshold circuit 30 and threshold switch 32 are functionally shown as entities separate from the receiver selector 16. Actually, as will be noted in connection with the description of Fig. 4, these latter units may form a portion of the receiver selector 16. Selector 16 is arranged such that it responds to the merit indicating unidirectional voltage of greatest amplitude as received from the various longitudinal balancing units 24, 24′, etc. to actuate its contactor 26 and close the circuit of only one switch 28, 28′, etc. at any instant. The closure of a switch 28, 28′, etc. connects to the output circuit 34 the audio signal output of the radio receiver that produces the unidirectional merit indicating signal of greatest amplitude. Concurrently, with this action, the merit indicating signal from each balancing unit 24, 24′, etc. is supplied to the threshold circuit 30, in which it is determined whether any one of the signals exceeds a predetermined minimum value that has been chosen as being representative of "just usable" or minimum quality received signals. If any one of the merit indicating signals exceeds this minimum value, it is indicative that some one of the receivers 12 is producing in its output circuit, the desired message signals at a level which, with respect to any accompanying noise currents or signals, has been previously adjudged to be suitable for service purposes. Under these conditions, the normally non-operated threshold switch 32 is closed, and output circuit 34 is connected to utilization circuit 18. Utilization circuit 18 may be any suitable terminating circuit such as a subscriber subset, a connecting circuit such as a trunk circuit, or a switchboard termination. If none of the merit indicating signals exceeds this minimum, or "just usable" value, the threshold switch 32 remains non-operated; notwithstanding that receiver selector 16 may have actuated its contactor 26 to select the best one of the subnormal indicating signals which is received from balancing units 24, 24′, etc., and, in so doing, has connected the signal output circuit of the appropriate receiver to the selector output circuit 34.

Figure 2:
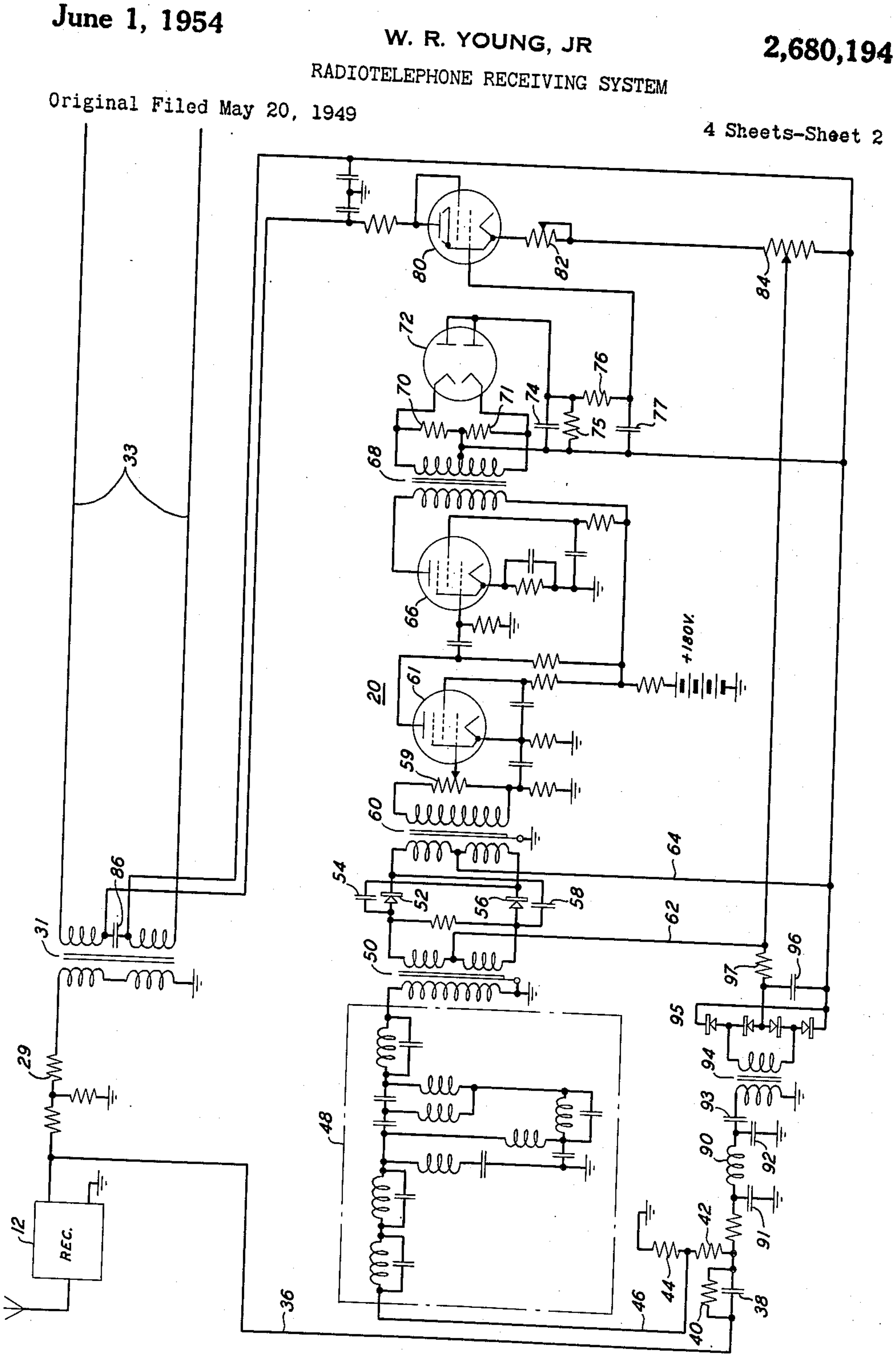
Fig. 2 is a schematic diagram illustrating primarily one of the noise detecting and evaluating units that are incorporated in a receiver selection system in accordance with the invention.
Figures 3, 5:
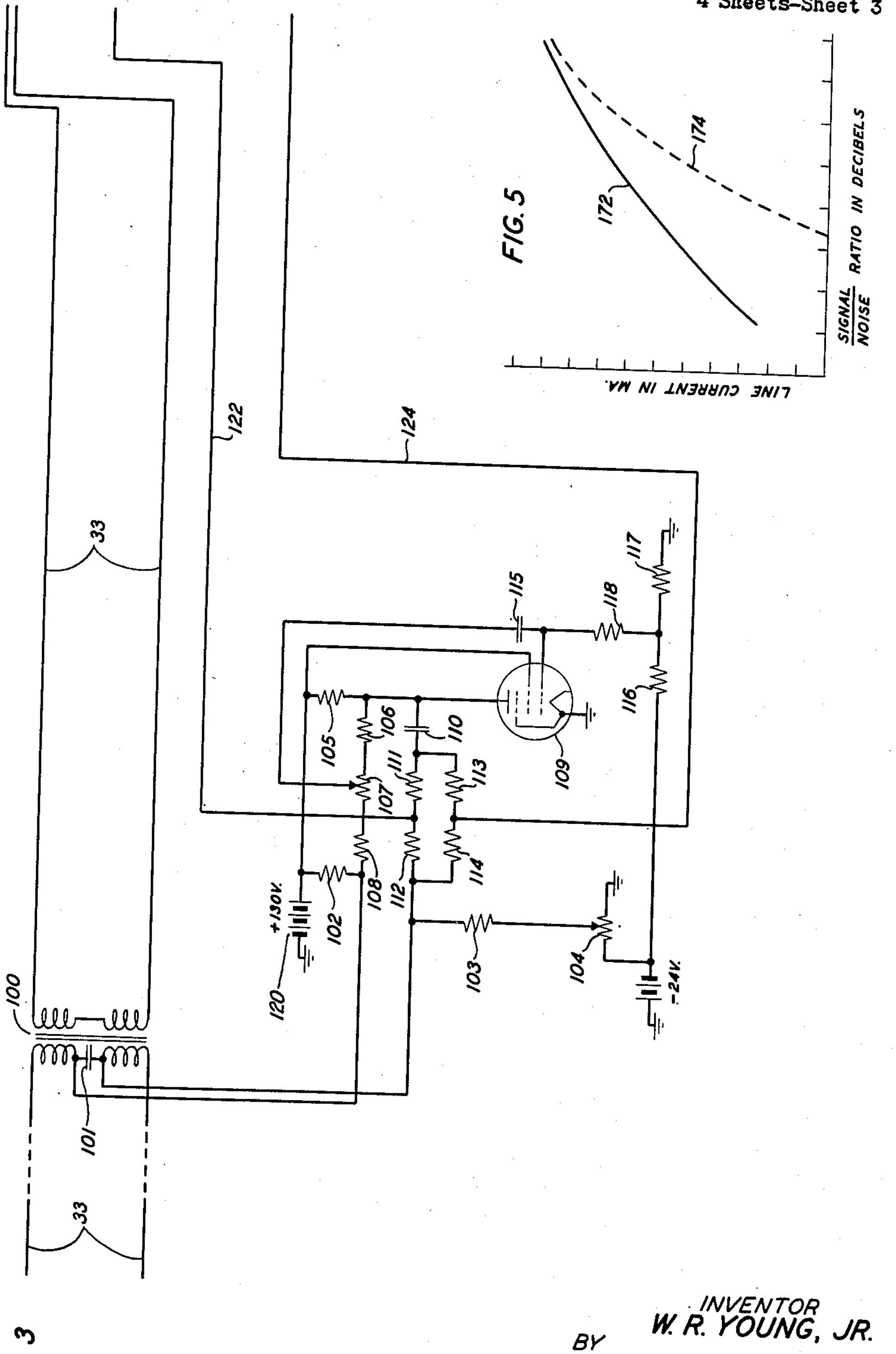
Fig. 3 is a schematic circuit diagram illustrating primarily one of the longitudinal balancing units that may be used in a selecting system in accordance with the invention for counteracting the effect of induced longitudinal noise currents on the merit indicating signal.
Fig. 5 is an explanatory graph to which reference is made in the circuit description.
Figure 4:
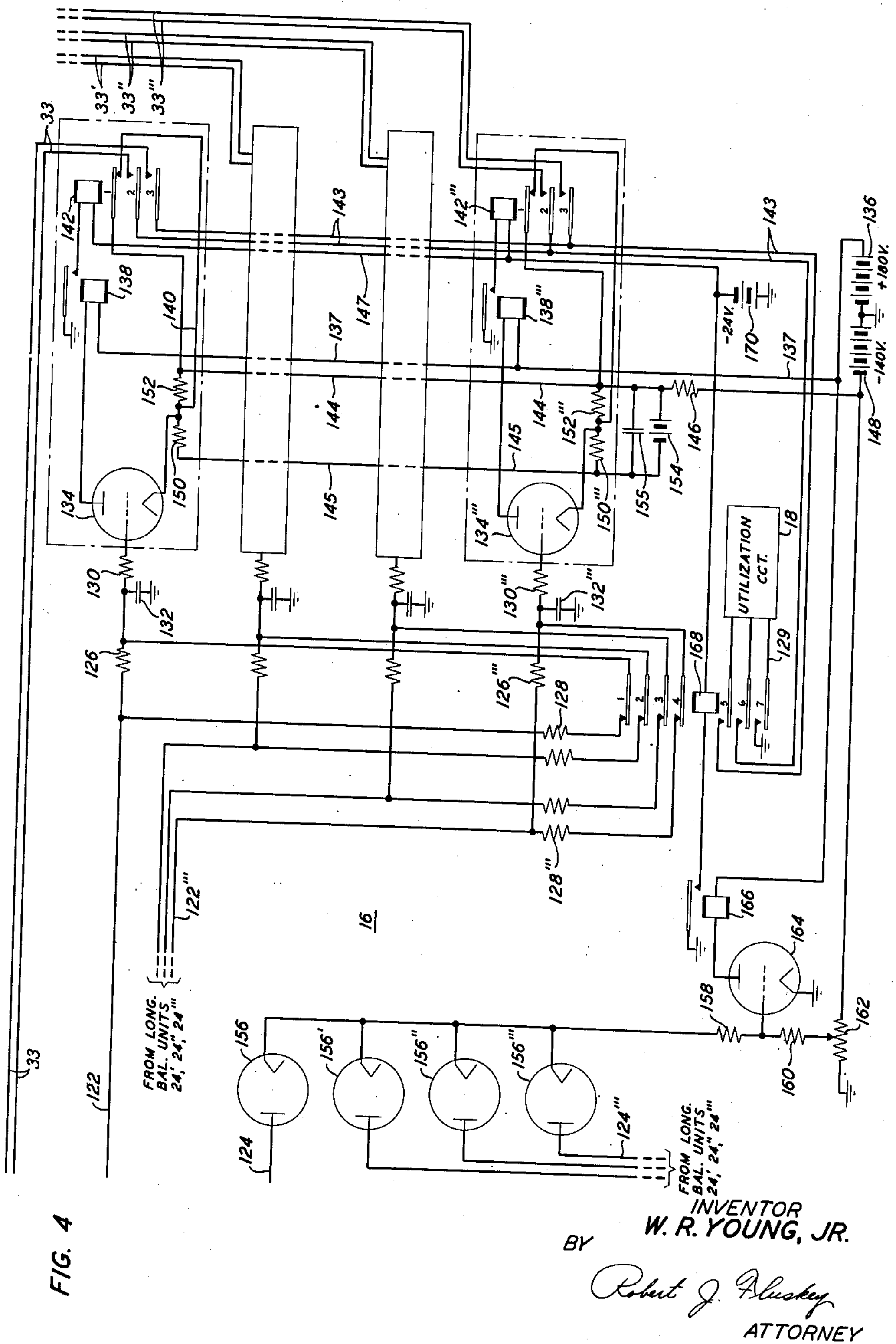
Fig. 4 is a schematic circuit diagram illustrating primarily a signal comparison and selecting circuit in accordance with the invention, for comparing the noise or merit indicating signals from the various message signal receivers, and for connecting to a utilization circuit the receiver output that is associated with the most desirable noise indicating signal.

The manner in which these described functions are performed may best be understood from a consideration of Figs. 2, 3, and 4 when arranged in the fashion shown in Fig. 6. In Figs. 2 and 3, only one noise detector 20 and one longitudinal balancing unit 24 are shown, inasmuch as it is believed that an understanding of this portion of the practice of the invention can readily be secured by a consideration of one selecting branch only. It should, of course, be appreciated that a complete selecting system would ordinarily employ as many detectors 20 and balancing circuits 24 as there are receivers 12 from which a selection is to be made. In Fig. 4, the details of two, the upper and lower, selecting channels only are shown, since it is believed that a thorough understanding of this portion of the invention may be secured from a consideration of the details and action of these two channels. It is to be understood that the circuit details of the intermediate selecting channels, the presence of which is diagrammatically indicated by the block representations, are substantially the same as those shown for the other channels.

*Detailed description*

Receiver 12 is shown at the upper left of Fig. 2. The output of this receiver is unbalanced with respect to ground, and is connected through a resistance pad or attenuator 29 and a transformer 31 to conductor pair 33. The attenuator 29 is provided so that the impedance of the line, as seen through the transformer 31, will not have an appreciable effect on the audio frequency and noise voltages appearing on conductor or lead 36. At this point, it may be noted that conductor pair 33 forms the same conductive connections that were shown separately in Fig. 1 as connections 14 and 22. One portion of the signal output from receiver 12, constituting the message channel thereof, is transmitted over conductor pair 33 to the receiver selector unit 16 (Fig. 4). A second portion of the output from this receiver, constituting the merit indicating signal channel thereof, is transmitted to noise detector 20 over conductor 36 to a frequency sensitive network comprising resistors 40, 42, and 44 and capacitor 38. This network discriminates in favor of the higher frequency noise energy, and aids in evaluating the interfering effect of unwanted interfering periodic radiations which may be modulated by low frequency components. One portion of the output from this network is connected over conductor 46 to a band-pass filter 48, the values of the circuit elements of which are so chosen that is rejected all frequencies within the band of message signal frequencies, and passes only frequency components both above and below this signal band. It is a purpose of this filter to eliminate, in so far as it is practicable, the message signal frequencies that are supplied over conductor 46. In a tested embodiment of the invention, this filter was designed to reject frequencies in the band between 200 and 7000 cycles per second and to pass or transmit frequencies outside of that band. Noise or interference frequency currents that are passed by filter 48 are connected through transformer 50 to the input of a variable loss circuit, which comprises transformers 50, 60, unidirectional conducting devices 52, 56, and capacitors 54, 58. Devices 52, 56 may be constructed of any of several suitable materials, and each has the characteristic that it conducts current in one direction with considerably greater facility than it does in the opposite direction, and also that its resistance in its conductive direction is controlled to a marked extent by the magnitude of the potential existing across the unit. Devices having these general properties are often termed "varistors," and will be so designated in this description. In a tested embodiment of the invention, these devices 52, 56 were dry-disc copper oxide type of varistors. Capacitors 58, 54 act to neutralize the capacities that are inherent in this type of varistor, and together with these inherent capacities form a balanced capacitive bridge arrangement. The values of capacitors 58, 54 will, of course, depend upon the inherent capacitance of the actual varistors that may be used. Conductors 62, 64 are connected to the mid-points of the windings of transformers 50, 60 and serve to impress across the varistors 52, 56, a varying potential which is derived in a manner which will now be described.

Capacitors 91, 92, 93 and inductor 90 comprise a band-pass filter which has minimum attenuation at a frequency corresponding to the middle of the message signal band. The attenuation of this filter at frequencies outside the band of message signal frequencies is relatively high. The message signal frequencies are passed through a transformer 94 to a full wave rectifier 95 to develop across potentiometer 84 and filter capacitor 96 a unidirectional voltage which is indicative of the presence of and the strength of message signal frequencies in the output of the radio receiver. The polarity of this rectified voltage is opposite to the polarity of the voltage that is developed across potentiometer 84 by the anode-cathode current of the electron discharge device, specifically a pentode, 80, which also flows through this potentiometer. Conductors 62, 64 are connected across potentiometer 84 in such fashion that they apply to the varistors 52, 56 a potential which is the algebraic sum of the potentials developed across potentiometer 84 as described. It might be stated at this point that this last described circuit branch, comprising the full wave rectifier 95, is provided in order to desensitize the noise detector 20 during periods when the level of the message signals at the transmitting station is exceedingly high. The reason for this will be developed in connection with the description of the operation of the circuit. Thus, the transmission loss through the variable loss circuit is controlled by the potential that is applied over conductors 62, 64 to the varistors 52, 56 in this circuit.

The secondary winding of transformer 60 is terminated by potentiometer 59. The control grid of an electron discharge device, specifically, a pentode 61 is connected to the movable arm of potentiometer 59, and this device comprises the first stage of a two-stage amplifier which includes the pentodes 61, 66. This amplifier may be in accordance with conventional design. Its circuit constants are so chosen that it has a substantially uniform amplification characteristic over a range which includes any desired frequencies above and below the message signal frequencies. The output of this amplifier is connected through a transformer 68 to a full wave rectifier circuit comprising a double diode 72, terminating resistors 70, 71 and load resistor 75. The output of this rectifier is passed through an energy storage and filter arrangement comprising load resistor 75, a capacitor 74, and the resistor-capacitor combination 76, 77. The time constants of the rectifier and storage circuits are chosen such that a finite time is required for the energy contained in sudden sharp bursts of noise to develop full potential across capacitor 74. In one tested embodiment, a suitable time constant for this circuit was found to be about 100 microseconds. After a potential has been developed across capacitor 74 by a surge of energy, this condenser will discharge partly through resistor 75 and partly through the resistor-capacitor combination 76, 77. This latter combination forms a filter circuit which prevents undesirably sudden changes of potential from accumulating across capacitor 77. The discharge time constant of capacitor 74 is preferably relatively long with respect to its changing time constant, and in one tested embodiment of the invention a discharge time of about 10 milliseconds was found to be satisfactory. The successful practice of the invention is, of course, not limited to the use of the above-mentioned time constants. Any other suitable time constants may be used with equal facility. In general, it is believed that the relationship of the charging and discharging rates should be correlated with limiting factors in other portions of the communication system; for example, such factors as the cut-off characteristics of the signal channel, and the response of, or appreciation period, of a limiting unit in the utilization process. In an aural communication system, wherein the highest frequency of the message signal is restricted to some definite value, and in which some element, such as the ear, has a fairly definite minimum appreciation period; it might be desirable to restrict the charging period to a value suitably less than one-half the cyclic period of the highest usable signal frequency, and to arrange the discharge period at a value suitably less than the minimum appreciation period of the ear. Such an arrangement imparts to the detected interference components a weighting factor that is variable with frequency, and which causes the control effect of these detected components to vary in a manner that is similar to that in which the impairment effect of noise components is observed to vary in the utilization circuit. At the same time, the response of the detection device is fast enough to permit the proper evaluation, or appreciation, of undesirable quantities of interference energy in a shorter period than is required by the limiting receptive member for a similar appraisal. The control electrode of pentode 80 is connected to the common point of resistor-capacitor combination 76, 77. The cathode circuit of pentode 80 includes an adjustable resistor 82 and the potentiometer 84, across which are connected conductors 62, 64. Anode power supply for pentode 80 is secured from the respective longitudinal balancing circuit 24 (Fig. 3) at the control terminal point or site. This potential is transmitted to the location of noise detector 20 over the upper conductor of conductor pair 33. The lower conductor of conductor pair 33 forms the return path for this circuit and is connected to the anode-cathode circuit of pentode 80 at the lower end of cathode load potentiometer 84. Capacitor 86 joins the upper and lower sections of the secondary winding of transformer 31 to form a conductive path for the voice frequency signal currents from receiver 12, and to block the direct current that is flowing in the upper and lower conductors of pair 33.

A similar blocking function is performed by capacitor 101 at the longitudinal balancing unit end of conductor pair 33, as is shown in Fig. 3. Transformer 100 is inserted in the circuit of conductor pair 33, and together with capacitor 101, forms a blocking circuit for the direct current derived from potential source 120 through resistor 102. The anode-cathode circuit of pentode 80 (Fig. 2) includes potential source 120, load resistor 102, the upper conductor of conductor pair 33, resistors 82, 84, the lower conductor of conductor pair 33, resistor 103, a portion of voltage dividing potentiometer 104 to the grounded terminal of source 120.

Voltage dividing potentiometer 104 provides a convenient and ready means of adjusting the potential of the cathode of pentode 80. This potentiometer provides a means for imparting a small fixed adjustment to the unidirectional signal voltage as it is obtained from the noise detector 20, and permits the proper coordination of these voltages from the various noise detector units of a selecting system. Resistors 102 and 103 may be approximately equal and of any suitable value consistent with the length of conductor pair 33 and the characteristics of pentode 80.

With respect now to the longitudinal currents balancing circuit or unit 24, anode potential for balancing electron discharge device or pentode 109 is supplied from potential source 120 through anode load resistor 105. Resistors 106, 108, potentiometer 107 and anode load resistor 105 form a voltage dividing circuit. The movable arm of potentiometer 107 is connected through a coupling capacitor 115 to the control electrode of pentode 109. Values for these components and the dynamic characteristic of pentode 109 are coordinated such that, the amount of voltage change that is applied to the control grid of pentode 109 is just sufficient to counteract in its anode circuit the voltage change that occurs at the junction of resistors 102, 108. For example, if the potential at the junction of these latter resistors changes by one volt in a positive direction, the potential at the anode of pentode 109 will change by an equal amount in the opposite direction. Because of the large amount of voltage feedback present in the anode control grid coupling circuit, the transmission equivalent between the junction of resistors 102, 108 and the anode of pentode 109 is determined primarily by the voltage dividing circuit comprising resistors 106, 107 and 108, and is relatively independent of changes in the other parts of the circuit. Resistors 116, 117, 118 form a voltage dividing network for the proper biasing of the control electrode of pentode 109. The anode circuit of pentode 109 is connected through coupling capacitor 110 to two voltage dividing circuits, one of which includes equal valued resistors 111 and 112, the other of which includes equal valued resistors 113, 114. The value of these resistors may, but need not be, the same so long as the paired resistors are equal valued. Conductors 122 and 124 are connected at one end of each to the junctions of resistors 111, 112 and 113, 114 respectively. The other ends of these conductors are connected to the input circuits of the selecting and threshold branches, respectively, of receiver selector 16 (Fig. 4).

The noise indicating signal on conductor 122 is supplied to the input of the channel selection branch of selector 16 (Fig. 4) which branch includes an electron discharge device, specifically, a triode 134. Resistors 126 or 128 and capacitor 132 constitute an integrating network for adding a predetermined delay to the voltage changes that are supplied to the control electrode of the triode 134. Whether resistor 126 or resistor 128 forms a component of this integrating network depends upon whether relay 168 is operated. Resistor 128 is smaller than resistor 126 by any desirable amount in order to provide a faster selection by triode 134 at the beginning of a transmission interval.

In its non-conduction state, the anode-cathode circuit of triode 134 includes source 136 of anode potential, conductor 137, the winding of relay 138, the space-discharge path of triode 134, conductor 140, contact 1 of relay 142, conductor 144, cathode-biasing resistor 146 and a source 148 of negative potential, the positive terminal of which is connected through a common ground connection to the negative terminal of source 136. A source 170 of negative potential is connected over conductor 147 to the winding of relay 142, and meets operating ground over the contact of relay 138 when this latter relay is operated. Resistors 150, 152 are connected over conductors 144, 145 to form a voltage divider across a biasing source 154 and its filter capacitor 155. The cathode of triode 134 is connected to the junction of these resistors. When relay 142 is operated, in a manner which will be presently described, the message signal conductor pair 33 is connected over contacts 2 and 3 of this relay and conductor pair 143 to contacts 5 and 6 of relay 168 in the threshold branch of the circuit. Operation of this latter relay connects the signal output of the selected receiver 12 (Fig. 2) to the utilization circuit 18. The operation of relay 168 also supplies ground over contact 7 and lead 129 to a signal lamp in the terminating switchboard of utilization circuit 18, when provided, to indicate that some one of the receivers 12 is producing a message signal of usable quality.

The unidirectional voltage signal from each longitudinal balancing unit 24 is supplied over the respective conductor 124, 124', etc. to a unidirectional device 156, 156', etc., in the threshold branch of the circuit. The cathodes of these devices are connected in parallel and their circuit includes load resistors 158, 160 and a portion of potentiometer 162. The control electrode of an electron discharge device or triode 164 is connected to the common point of resistors 158, 160. The lower end of resistor 160 is connected to the movable contact of potentiometer 162, which forms a voltage divider across the source 148 of negative potential. The anode-cathode circuit of triode 164 includes the source 136 of positive potential, the winding of a relay 166, the space discharge path of triode 164 and a ground connection which is common to the source 136. The operation of relay 166 connects operating ground over its contact to one terminal of the winding of relay 168, the other terminal of which is connected to the source 170 of negative potential.

It will be noted from Fig. 4 of the drawing that, in this described embodiment of the invention, selector 16 comprises four parallel selecting branches, or channels. The circuit details of each of these channels are substantially identical with those of the first, or upper, channel which have been described. Like circuit elements have been assigned the same reference numeral in each channel, and either a single, or double, or a triple prime exponent has been added to the numeral to properly identify the element in its branch, or channel location. Most of the circuit details of the intermediate branches, or channels, of selector 16 have been omitted in the interest of simplicity, and the presence of these branches is indicated by the block diagrammatic representations.

*Description of operation*

The operation of the selecting system of this invention, the structure or circuit arrangement of which has just been described, can best be understood from the following description of the operation of the arrangement shown in Figs. 2, 3 and 4. Assume first that no receiver of the system, as exemplified by receiver 12 (Fig. 2), is receiving a usable train of message signal waves. Under these circumstances, the noise energy in the output circuit of receiver 12 will ordinarily be at a relatively high level. In a manner which will be presently explained, the bias voltage on the control electrode of pentode 80 in noise detector 20 will be at a relatively high negative value, and the current flowing in its anode-cathode path and in conductor pair 33 will be low. The voltage drop across resistor 103 (Fig. 3) will be small, and the potential that is supplied to conductors 122, 124 by the potentiometer circuits comprising resistors 111, 112, 113, 114 will be low. The actual value of this potential on conductor 122 may or may not be sufficient to cause triode 134 to conduct, and in so doing to operate its anode load relay 138. If relay 138 is operated, it completes the ground connection for operation of relay 142, thereby connecting the signal output of receiver 12, on conductor pair 33, over contacts 2, 3 of relay 142, to interconnecting pair 143, the circuit of which is open at contacts 5 and 6 of relay 168. The potential supplied over conductor 124 to diode 156 in the threshold branch of selector 16 will be low, and the voltage that is developed across voltage divider 158, 160 will also be low. The portion of this potential that is supplied to the control grid of triode 164 will be insufficient to overcome the negative bias that is derived by its control electrode from potentiometer 162. Under these circumstances, triode 164 will not conduct current, its anode load relay 166 will not be operated, threshold relay 168 will not be connected to ground from the contact of relay 166 and will remain unoperated, and the circuit from conductor pair 143 to the utilization circuit 18 will be broken or open at contacts 5 and 6 of relay 168. Therefore, notwithstanding that the upper selecting branch of selector 16 may have functioned to connect the signal output of receiver 12 to interconnecting pair 143, the output of this receiver is not connected to utilization circuit 18 because the threshold circuit has adjudged the received noise signal to be representative of output signals that are less than the "just usable," or minimum, commercial grade. This "just-usable" or minimum value signal is a predetermined quantity, and may be changed by varying the position of the movable arm of potentiometer 162. Now assume that a usable grade of audio message signal exists in the output of receiver 12. Because the level of energy in the output circuit of the receiver is controlled by the level of modulation at the transmitter, the noise energy in the output circuit of the receiver will be reduced from its former high value by some unspecified amount. This revised output energy is treated in the same manner as was the previous noise energy. A portion of it is transmitted through attenuator 29 and transformer 31 to conductor pair 33, and over this conductor pair to contacts 2 and 3 of relay 142 in receiver selector 16. Assume for purposes of this explanation that, at this time, this relay is unoperated and contacts 2 and 3 are open. A second portion of the signal output from receiver 12 is supplied over conductor 36 to the frequency sensitive network comprising capacitor 38 and resistor 40 and voltage dividing resistors 42, 44. The transmission loss through this network varies inversely with frequency. The network has two output circuits, one of which is connected to the band-pass filter comprising inductor 90 and capacitors 91, 92. The message-signal output from this filter is supplied through transformer 94 to full-wave rectifier 95. The rectified output voltage is applied over conductors 62, 64 to the variable loss circuit comprising varistors 52, 56, and tends to control the loss through this circuit by controlling the impedances of the varistors. The second output from the frequency sensitive network 38, 40 is applied over conductor 46 to the input of band-reject filter 48, the characteristics of which are such that it passes frequencies both above and below, but not within the band of message signal frequencies. Because of the frequency discriminating action of network 38, 40, the higher frequency noise components are transmitted to band-reject filter 48 with greater facility than are the low frequency components. As was previously stated this arrangement is helpful in evaluating the interfering effect of unwanted radiations which may be modulated by low frequency components. The noise energy that is passed by filter 48 is transmitted through the variable loss circuit comprising transformers 50, 60 and varistors 52, 56 to the amplifier comprising devices 61, 66. This amplified noise energy is rectified in the full-wave rectifier circuit comprising the double diode 72, balancing resistors 70, 71 and load resistor 75, together with its filter which includes capacitors 74, 77 and resistor 76. Because of the limiting action in receiver 12, less noise energy will now be rectified than was previously the case, and the potential across capacitor 77 will be reduced. The negative potential at the control grid electrode of pentode 80 will now be less than in our previously assumed case, where no message signal was being received. The anode-cathode current in this pentode will now be increased, and will provide a greater voltage across potentiometer 84 than heretofore existed. The potentials that are generated across this potentiometer by the passage through it of cathode current from pentode 80 and the rectified current from rectifier 95 are opposed in polarity. The net potential is supplied over conductors 62, 64 to the previously mentioned variable loss circuit comprising varistors 52, 56 where it controls the transmission loss through this circuit by affecting the characteristics of these varistors.

The action of this feedback arrangement is to linearize the relationship between the current flowing in the anode-cathode circuit of pentode 80, with respect to logarithmic variations in the level of the noise input to detector 20. This action comes about because the magnitude of the anode-cathode current of pentode 80 is an inverse function of the level of the rectified noise energy. As the noise level is decreased, the cathode current of pentode 80 and the potential across potentiometer 84 are increased. This increased voltage is fed back over conductors 62, 64 to the variable loss circuit where it decreases the transmission loss by controlling the characteristics of varistors 52, 56. This action tends to increase the rectified noise energy, and thereby reduce the cathode current of pentode 80, and the potential across potentiometer 84. The net effect of this arrangement is to produce a stabilized system having the desired characteristic, such as is shown by the idealized curve 172 of Fig. 5. Curve 172 shows the manner in which the anode-cathode current in pentode 80 may be changed by logarithmic variations in the level of the noise energy that is applied to the input of detector 20 when sufficient voltage is fed back to control varistors 52, 56 possessing suitable current-voltage characteristics. If no feedback arrangement, or its equivalent, were used the input-output characteristic of detector 20 would be similar to that shown by curve 174 of this figure. It will be noted that this latter curve varies considerably from the more desirable logarithmic characteristic and that its operation is restricted to a relatively small range of input levels. The departure may be great enough that signals having a suitable or acceptable noise ratio would be rejected. From the described action of detector 20, it will be appreciated that this unit produces in its anode-cathode circuit, and, therefore, in the direct-current circuit which includes conductor pair 33, a current the magnitude of which increases linearly as the logarithmic relation between the signal and noise in the output of receiver 12 is increased. Therefore, for low noise values this current will be at its maximum values. Potentiometer 84 is made adjustable to permit control of the amount of this fed back voltage so that essentially the same input-output characteristic may be obtained from each noise detector 20 in the selecting system.

Because non-linearity generally exists in the transmission path between the input to a radio transmitter and the signal output of its associated receiver, there results a distortion product or products whenever a message signal is transmitted. This distortion product may not be appreciable under ordinary circumstances, but it becomes more prominent as the input signal attains an extraordinary high level. This corresponds to a high level of modulation, which produces a loud or high level output signal. Many of these distortion products fall in the frequency range above and below the signal frequency band, and are thus passed by the band-reject filter 48. Since they are passed by this filter, the detector circuit 20 would normally treat them as indications of objectionable noise conditions, if it were not for the operation of that portion of the circuit that comprises full-wave rectifier 95. This portion of the circuit receives some of the audio signal energy from the frequency sensitive network 38, 40 and produces from it a unidirectional voltage, the magnitude of which is indicative of the level of the message signal, and the polarity of which is opposite to the polarity of the voltage generated across cathode potentiometer 84 by the flow of cathode current in pentode 80. Being thus poled, this rectified voltage acts on varistors 52, 56 during period of high message signals to increase the transmission loss through these units, and thus to momentarily incapacitate noise detector 20. Through this action, the noise detector 20 is prevented from mistaking distortion products, which arise from otherwise desirable message signals, as objectionable interfering noise currents.

It will be noted that detector 20 is isolated from direct ground connection, and that the anode power supply for pentode 80 is derived over the line 33 from the associated longitudinal balancing unit 24 (Fig. 3) which may be, and probably will be located at a considerable distance from detector 20. None of the circuit elements associated with the line and pentode 80 have any direct current connection to the ground at the receiver location, the potential of all points in that part of the circuit being determined with respect to the ground potential at the control terminal. This prevents a difference in ground potential between any receiver station and the control terminal from altering and thus falsifying the indication signal.

The anode-cathode current of pentode 80, the magnitude of which is indicative of the ratio of the signal and noise in the output circuit of receiver 12, flows through conductor pair 33 and, therefore, is subject to any induced interfering voltages. Since this circuit is isolated from ground potential, these interfering voltages will be induced in equal amounts of the same polarity in each of the conductors of the pair.

The action of the longitudinal balancing unit 24 is such that the effect of these induced voltages is eliminated. Positive potential is supplied from source 120, through anode load resistor 102, over one conductor of pair 33, to the anode of pentode 80 in detector 20 (Fig. 2). This tube's cathode current flows through potentiometer 84, one conductor of pair 33, through resistor 103 and biasing resistor 104 to ground. Therefore, as the anode-cathode current through pentode 80 (Fig. 2) increases, the potential with respect to ground at the lower end of resistor 102 is decreased and at the upper end of cathode resistor 103 is increased. These resistors are substantially equal in value and, therefore, these changes in potential are equal and opposite. A portion of the potential change across anode resistor 102 is applied through the movable contact arm of potentiometer 107 and coupling capacitor 115 to the control electrode of pentode 109. This voltage produces in the anode circuit of pentode 109 a voltage change which is equal in amplitude and opposite in polarity to the change across resistor 102. This equal and opposite change is coupled through coupling capacitor 110 to the parallel voltage dividing circuits comprising resistors 111, 112 and 113, 114. Since the voltage at each end of the dividers is changed by the same amount, the potential of conductors 122, 124 with respect to ground is changed by an equal amount. If, however, interference voltages of the longitudinal type are induced on conducting pair 33, there will appear at the lower and upper terminals of resistors 102, 103, respectively, potential changes which are equal and of the same polarity. Under these circumstances, when a portion of the change that appears at the lower terminal of resistor 102 is applied through the movable contact of potentiometer 107 and coupling capacitor 115 to the control electrode of pentode 109, there appears in the anode circuit of this pentode a potential change which is equal in value but opposite in polarity to the potential change at the upper end of resistor 103. Since equal but opposed changes are made at the two ends of the voltage dividers, the potential on connecting circuits 122, 124 remains unchanged, and the interfering effect of the induced longitudinal voltage is eliminated.

The voltage on conductor 124 controls the operation of the threshold branch of selector 16 (Fig. 4) while that supplied over conductor 122 controls the operation of the receiver switching or selecting branch of the selector unit. In the following explanation of the operation of receiver selector 16 it will be understood that, although only one longitudinal balancing unit 24 (Fig. 3) is shown as providing unidirectional voltage signals to conductors 122, 124 of selector 16, similar signals are supplied over conductors 122′, 124′, etc. to the remaining switching, or selecting, and threshold branches of this circuit. These voltage signals are obtained from the noise detectors 20′, 20″, 20‴ and longitudinal balancing units 24′, 24″, 24‴ that are associated with the other receivers of the communication system. It will also be understood that the details of these circuits, although they are not shown on Figs. 2 and 3, are to be taken to be substantially the same as the details there shown for that one selection branch. The voltage on conductors 122, 124 is, as was stated, a single-ended signal, the magnitude of which varies inversely as the level of the noise energy varies in the output of the respective receiver. In our assumed example, the signal in the output circuit of receiver 12 is changed from one which consisted almost entirely of noise energy to one in which the message signal energy is dominant, and a relatively small amount of noise energy is included. The voltage signal on conductors 122, 124 is accordingly changed from a low voltage value to a relatively high voltage value. As the voltage on conductor 124 is increased, the negative bias on the control electrode of threshold tube 164 is counteracted by the potential developed across the rectifier load comprising resistors 158, 160, and the potential of this electrode is raised to a value where the resulting anode current flow is sufficient to operate relay 166. This condition corresponds to the reception of a usable or commercial grade of signal by receiver 12. It will be readily seen that this same action would occur if this commercially usable signal had been received by any one of the other receivers 12′, 12″ or 12‴. Relay 166 connects ground over its contact, through the winding of threshold relay 168, to potential source 170 and causes this latter relay to operate, which action opens contacts 1, 2, 3 and 4 and closes the contacts 5 and 6 of this relay. The closure of contacts 5 and 6 connects the output of a selected receiver, in this assumed case receiver 12, to the utilization circuit 18.

The manner in which receiver 12 is selected and the remainder of the receivers are rejected by the selection branch of selector 16 will now be explained. It was assumed that the anode current flowing in triode 134 was insufficient to hold its anode load relay 138 in the operated condition. When the voltage signal on conductor 122 changes from a relatively low value to a relatively high value, which value is in excess of any voltage signal that exists on incoming conductors 122′, 122″, 122‴, triode 134 is caused to increase its anode-cathode current to a value that is sufficient to operate relay 138. Relay 138 connects ground over its contact to the winding of relay 142. The operation of relay 142 opens the short-circuiting connection across resistor 152, provided by normally closed contact 1 of relay 142, and closes over its contacts 2 and 3 the connection from conductor pair 33 to interconnecting pair 143. Since pair 143 is closed through contacts 5 and 6 of relay 168 to the utilization circuit 18, the output of receiver 12 is connected to this latter circuit.

It will be noted that resistor 146 is included in the cathode circuit of each triode 134, 134′, etc. The voltage that is developed across this resistor by the combined current flow in all triodes 134, 134′, etc. exerts a degenerative feedback effect which tends to bias the cathode of each tube positive with respect to the potential of its control electrode. Therefore, if the same potential exists on each control grid electrode, the cathode of each triode will be at the same potential, however, if the potential of the control electrode of one triode exceeds that of the control electrode of any other triode, the current flow through the triode having the highest potential on its control electrode will establish the potential at all of the cathode electrodes. Therefore, as the current flow in triode 134 increases because of the increased potential on its control electrode, its cathode current flowing through the common load resistor 146 increases the potential of its own cathode electrode and that of all other connected cathode electrodes. If the potential increase is sufficiently large the entire anode-cathode current flow will be transferred to triode 134, and the remainder of the triodes 134′, 134″, etc. will cease conduction. This condition will continue until some one of the longitudinal balancing units 24′, 24″, etc. supplies to its associated selection branch of selector 16 a potential which is substantially equal to that existing on the control grid electrode of triode 134 in the upper branch. If such a condition prevailed receiver selector 16 might connect the output of two receivers, for example, receivers 12 and 12′ to the utilization circuit 18, or it might be subjected to undesirable indecision by switching from the output of one to that of another of the receivers as the noise energy in the ouput circuits of these receivers fluctuates one above the other by a slight amount. To prevent these conditions, a preferential biasing arrangement is provided such that when a usable signal has been chosen by selector 16, it will continue to be chosen until it is supplanted by a more desirable signal which exceeds the chosen signal by a predetermined amount. This preferential biasing feature is brought into action when relay 142 opens the circuit which was formerly closed over its contact 1. This action removes the short-circuit connection which formerly existed across resistor 152, and produces across the combined resistors 150, 152 a voltage drop which is equal to the potential of source 154. The effect of this action is to lower the potential of the cathode electrode of triode 134 with respect to the potential of the remaining cathode electrodes by a predetermined amount which is controlled by the relative values of resistors 150, 152 and the potential of source 154. Under these circumstances then, before any other branch of selector 16 can connect the output of its associated receiver to utilization circuit 18, and in so doing bias triode 134 of the upper branch to its non-conduction state, the potential on the control grid electrode of its associated discharge device must exceed the potential on the control grid electrode of triode 134 by at least the amount of the voltage drop across resistor 152.

Each electron discharge device or vacuum tube 134, 134′, etc., of the selector tube array is preferably chosen for a high transconductance wherein a relatively small change in grid-cathode potential difference will produce a relatively large change in anode-cathode circuit current. As already referred to hereinabove, the circuits associated with the electrodes of these tubes include feedback by virtue of the common cathode resistor 146, to establish an anode-cathode current in that one of the tube array whose control grid has received the highest-valued input signal, that is, input signal respective the best merit-indicating signal. This anode-cathode current remains substantially constant even though the potential applied to the control grid of such one tube varies or changes over a range corresponding to a wide variation of input; assuming, of course, that the range of variation of the potential applied to the control grids of the other tubes during such period is at all times less than the then applied potential on the control grid of the one tube, taking into consideration, also, the preferential bias provided by the resistor 152, 152′, etc. However, when the control grid potential on one of the other tubes is such that current is caused to flow in the anode-cathode circuit of such second tube, then a small variation in the potential of either such one tube or such second tube produces large changes of current in their respective anode-cathode circuits. In a tested embodiment of such a tube array, the devices 134, 134′, etc. were R. C. A. type 6SL7GT; the resistor 146 was one of 100,000 ohms; resistors 150, 150′, etc., and resistors 152, 152′, etc., were of 1000 ohms each; the relays 138, 138′, etc., were chosen and adjusted for operation on approximately .7 milliampere and for release on approximately .4 milliampere; cathode-anode circuit current through the cathode resistor 146 varied between approximately 1.5 and 1.9 milliampere.

For descriptive purposes, let it now be assumed that there is received on conductors 122‴ and 124‴, a signal having an amplitude that is greater than that of the signal on conductors 122, 124 by more than the voltage drop across resistor 152. The main anode-cathode conduction path will be transferred from the upper selection branch, which includes triode 134, to the lower selection branch, which includes triode 134''', because of the degenerative bias that the increased anode-cathode current in triode 134''' imposes upon the control electrode of triode 134. Under these circumstances, triode 134 will cease conducting, relays 138 and 142 will release, and, in so doing, open the connection between conductor pairs 33 and 143, and restore the short-circuiting connection across resistor 152. Simultaneously with this action, relays 138''' and 142''' will be operated to connect conductor pair 33''' to conductor pair 143, and to open the short-circuiting connection around resistor 152''' over contact 1 of relay 142''', to add the preferential bias voltage across resistor 152''' in favor of the lower selecting branch. The lower selecting branch will continue to connect the output of its associated receiver 12''' to the utilization circuit 18 as long as the merit indicating signal provided by its longitudinal balancing unit 24''' continues to exceed that supplied by any of the other associated balancing units. Since the potential that existed at the control electrode of triode 164 in the threshold branch of selector 16 was adequate to provide sufficient anode-cathode current in this triode to hold operated the anode load relay 166, the increased signal on conductor 124''' causes no added effect.

If the voltage that is derived by the threshold circuit from conductors 124, 124', etc. is at any time decreased to a value where the potential on the control electrode of tube 164 is insufficient to hold relay 166 operated, the connection between conductor pair 143 and utilization circuit 18 will be broken; notwithstanding that some one of the selecting branches of receiver selector 16 may be operating to connect the output of its associated receiver to conductor pair 143, and to exclude the output of all other receivers in the system. If this condition exists for an undesired interval, and it is desired to accept any one of whatever understandable or decipherable receiver outputs are actually present, appropriate adjustment at the control terminal of the potentiometer 162 will effect a shift downwardly of the operating level of the device 164, and render what would not be "acceptable" with the initial setting of the potentiometer, connectable through to the utilization circuit. Of course, if instant radio transmission conditions or the presence of extraneous industrial interference should preclude any character of usable or understandable signal being produced in the receiver output circuits, use of the system necessarily would await upon the clearing of such conditions.

The invention has been described as being incorporated in a receiver selecting system that is arranged to choose between the output signals of four receivers of the same message signal wave. It should be evident that this is only one embodiment of the invention, and that variations of this arrangement which do not depart from the spirit and scope of the invention will occur to those skilled in the art. Although the invention has been described as being incorporated in a radio communication system, it should be appreciated that it may be applied with equal facility in a variety of different types of selecting and switching arrangements in which the relative desirability of the various units or circuits is indicated by an appropriate derived or representative electrical factor, for example, a unidirectional voltage signal.

What is claimed is:

1. In combination, a plurality of control signal paths, which control signals may be respectively of different control merit in a given interval and respectively variable in control merit during successive intervals, utilization means to be controlled during any interval by that one of the control signals incoming over said paths that is then of the better control merit, a like plurality of electron discharge devices each including a cathode, anode and control electrode, cathode-anode and cathode-control electrode circuits for each of said devices, a source of cathode-anode circuit current for said devices, a load resistor common to the cathode-anode circuits of said devices for biasing substantially to cut off all of said devices except that one whose control electrode has impressed thereon the control signal of better control merit, means coupling a control signal path to the cathode-control electrode circuit of a respective one of said devices, and means in each of said cathode-anode circuits to effect during any interval a desired control with respect to said utilization means, upon cathode-anode circuit current-conduction of preassigned degree in one of said devices responsive to that one of the control signals of the better control merit.

2. The invention of the preceding claim in which the cathode-anode circuit of each of said devices includes means for applying a preferential bias to the device when the device is the non-cut-off one of said devices, whereby said non-cut-off device may in turn be cut off only by the impressing on the control electrode of another of said devices, of a control signal of better control merit by a predetermined margin over that applied to such non-cut-off device.

3. In combination, a plurality of electron discharge devices each comprising a cathode, an anode and a control electrode, cathode-anode and cathode-control electrode circuits for each of said devices, a cathode-anode circuit current source for said devices having a positive potential terminal connected to the anodes of said devices, a load resistor common to the cathode-anode circuits of said devices and having one terminal thereof connected in common to the cathodes of said devices and having another terminal thereof connected to the negative potential terminal of a second current source, a signal input circuit respective to each cathode-control electrode circuit, said input circuit including voltage integrating means for imparting a time delay to the signal variations applied to said respective cathode-control electrode circuit, and an output circuit respective to each of said cathode-anode circuits.

4. The invention of claim 3 in which said voltage integrating means may be varied from one to another value thereby imparting a greater or lesser time delay to the signal variations applied to said cathode-control electrode circuit, and means for controlling said integrating means in accordance with the applied signal.

References Cited in the file of this patent

UNITED STATES PATENTS

| Number | Name | Date |
|---|---|---|
| 1,593,993 | Sprague | July 27, 1926 |
| 1,801,657 | Buyko | Apr. 21, 1931 |
| 1,819,599 | Francis | Aug. 18, 1931 |
| 2,350,888 | Hall | June 6, 1944 |
| 2,535,377 | Titterton | Dec. 26, 1950 |
| 2,552,013 | Orpin | May 8, 1951 |
| 2,611,017 | Bailey | Sept. 16, 1952 |
| 2,632,046 | Goldberg | Mar. 17, 1953 |
| 2,637,810 | Moerman | May 5, 1953 |